United States Patent [19]
Thompson et al.

[11] Patent Number: 5,923,617
[45] Date of Patent: Jul. 13, 1999

[54] FREQUENCY-STEERED ACOUSTIC BEAM FORMING SYSTEM AND PROCESS

[75] Inventors: R. Lee Thompson, Panama City Beach; W. J. Zehner, Lynn Haven, both of Fla.

[73] Assignee: The United States of America as represented by the Secretary of the Navy, Washington, D.C.

[21] Appl. No.: 08/807,106

[22] Filed: Feb. 5, 1997

[51] Int. Cl.$^6$ ............................... G01S 15/00; G01S 3/80
[52] U.S. Cl. ........................... 367/103; 367/119; 367/138
[58] Field of Search ..................................... 367/103, 119, 367/138

[56] References Cited

U.S. PATENT DOCUMENTS

| | | | |
|---|---|---|---|
| 3,493,759 | 2/1970 | Adler | 359/311 |
| 5,150,336 | 9/1992 | Sullivan et al. | 367/103 |
| 5,608,690 | 3/1997 | Hossack et al. | 367/138 |
| 5,663,930 | 9/1997 | Capell, Sr. et al. | 367/119 |

OTHER PUBLICATIONS

Liu et al., "General Two–Dimensional Planar Transducers and Blazed array–like interdigital Transducer", IEEE 1986 Ultrasonics symposium proc. (Cat. No. 86CH2375–4), pp. 129–132, Nov. 1986.

*Primary Examiner*—Ian J. Lobo
*Attorney, Agent, or Firm*—Harvey A. Gilbert; Donald Peck

[57] ABSTRACT

A sonar system includes a pulse generator that produces an electrical signal having a plurality of frequencies. An acoustic radiator formed as a first blazed acoustic array is arranged to be driven by the electrical signal from the pulse generator. The blazed acoustic array includes a plurality of acoustic elements rotated away from the general plane of the array. The acoustic elements are arranged to be driven by the electrical signal from the pulse generator so that they radiate a sonic field that includes a plurality of sonic frequencies with each frequency being radiated at a characteristic angle. An acoustic receiver formed as a second blazed acoustic array is arranged such that components of the acoustic field reflected from the target toward the acoustic receiver produce acoustic waves having frequencies that correspond to the angles of incidence of the reflected acoustic field components. The signals indicative of the reflected frequencies are processed to form an image of the target. The invention may be embodied including phase delay, time delay, or synthetic aperture beamforming means.

10 Claims, 2 Drawing Sheets

FREQUENCY-STEERED ACOUSTIC BEAM FORMING SYSTEM AND PROCESS

BACKGROUND OF THE INVENTION

1. Field of the Invention

This invention relates generally to acoustic beamforming. More particularly this invention relates to using angular spectral dispersion in a passive or active acoustic system to form spatially discriminating beams.

2. Description of the Prior Art

The dispersion of a frequency spectrum into angular space is commonly seen in optics. An optical prism spreads white (multi-frequency) light into a spectrum that is angularly dispersed in frequency. Optical dispersion can also be accomplished with a grating. A blazed grating is commonly used to create optical dispersion of reflected light. A blazed grating is characterized by the blaze angle, which is the angle between the effective surfaces of the profile and the general plane of the grating.

Radar systems also employ this general principal in a technique called frequency-scanned arrays. See Skolnik, *Radar Handbook,* McGraw-Hill, Ch. 13 (1970). This technique employs delay lines on the antenna staves to provide the proper phase shifts so that the frequency determines the steering angle of the main beam of the array. These radar systems differ from phased array radar because phased array radar allows full use of the frequency band for purposes beyond beam scanning.

In the prior art, active and passive acoustic systems such as sonar and ultrasound have employed the well-known techniques such as phased or tine-delayed arrays to steer beams. Phased arrays are limited by their complexity, Each stave must be sampled individually, and be accompanied by the requisite hardware. This results in acoustic systems having large size, weight and power requirements. Consequently, the sonar must suffer either limited performance or limited applicability when the footprint of an acoustic imaging system must be small as in sonar systems in small underwater vehicles.

RE U.S. Pat. No. 034,566 to Ledley, discloses an ultrasound technique that creates multiple acoustic beams with different frequencies by utilizing a plurality of independent, narrow-band transducers. Each transducer is arranged and driven such that its beam covers one beam of the sonar's field of view. Because each transducer (or line of transducers) works independently, this technique does not form a coordinated array of sensors across the angular dimension utilizing the multiple frequencies. Therefore, it does not provide the improved azimuth discrimination gains typically associated with an array of transducer elements, but instead is limited to the resolution provided by a single transducer element. In the mechanically fixed embodiment this technique requires a separate transducer for every beam. Therefore, the available aperture is severely under-utilized and the number of beams limited. In the rotating embodiment this technique is limited by the mechanical scanning speed and the added mechanical complexities of the rotating projector.

SUMMARY OF THE INVENTION

It is thus an object of the present invention to provide a means and method of producing frequency-dispersed acoustic soundfields by introducing transmit delays, via electronic or physical means, along a transmitting acoustic aperture.

It is another object of the present invention to provide a means and method of steering a transmitted acoustic beam or beams by introducing transmit delays, via electronic or physical means, along a transmitting acoustic aperture and transmitting one or a plurality of narrow band signals.

It is yet another object of the present invention to provide a means and method of producing frequency-dispersed acoustic soundfields by orienting the active faces of a transmitting array of acoustic elements at some angle from the general plane of the array.

It is still another object of the present invention to provide a means and method of steering a transmitted acoustic beam or beams by orienting the active faces of a transmitting array of acoustic elements at some angle from the general plane of the array and transmitting one or a plurality of narrow band signals.

It is yet another object of the present invention to provide a means and method of producing spatially filtered beams by applying spectral or scale filters to a single receive signal.

It is still another object of the present invention to provide a means and method of producing a multiple independent-beam active or passive acoustic system with only a single array input/output channel.

It is yet another object of the present invention to provide a means and method of producing an active or passive acoustic system with multiple independent beams along one dimension of the system's field of view.

It is still another object of the present invention to provide a means and method of producing an active or passive acoustic system with multiple independent beams along two dimensions of the system's field of view.

It is yet another object of the present invention to provide a means and method of producing independent sets of beams along a second dimension of an acoustic system's field of view that produces multiple independent beams along a first dimension of the system's field of view with beamforming means such as but not limited to phase delay, time delay, and synthetic aperture.

It is yet another object of this invention to provide a means and method of producing an acoustic system with multiple independent beams with a blazed transmit array only, a blazed receive array only, or a blazed transmit and receive array.

It is still another object of the present invention to provide a means and method of improving the resolution of an acoustic system by applying the present invention and a beamforming means other than the present invention along the same dimension of the acoustic imaging systems field of view.

The present invention is a means and method of forming multiple independent acoustic beams of different frequencies by introducing transmit or receive delays along the aperture of an acoustic system.

The present invention uses techniques analogous to radar frequency scanning with an acoustic array that is analogous to an optical blazed grating. The beamforming technique according to the present invention provides dramatic reductions in complexity of an acoustic system with little or no reduction in performance. In this way, a multi-beam acoustic system can be designed with significantly lower size, weight, and power requirements than previously possible. Also, because this approach can be implemented as a complement to phased or synthetic array techniques, additional performance can be added to phased array or synthetic aperture systems with minimal system impact. For example, a two-dimensional ultrasound system with adequate bandwidth could be designed instead as a three-dimensional ultrasound system without additional hardware channels, which overcomes a significant limitation in ultrasonic array design.

The system, according to the present invention for forming a frequency-dispersed acoustic field, may suitably comprise, consist of, or consist essentially of the following elements including a pulse generator for producing an electrical signal having a plurality of frequencies and a blazed acoustic array. The blazed acoustic array includes a plurality of acoustic elements formed in an echelon array with adjacent acoustic elements being displaced from one another. The acoustic elements are arranged to be driven by the electrical signal from the pulse generator so that they radiate a sonic field that includes a plurality of sonic frequencies with each frequency being radiated at a characteristic angle.

The blazed array may also be formed as an acoustic receiver that comprises a plurality of acoustic elements formed in an echelon pattern with adjacent acoustic elements being displaced from one another such that an acoustic field having components that are angularly dispersed as a function of frequency incident upon the receiver produces acoustic waves therein having frequencies that correspond to the angles of incidence of the acoustic field components.

The system, according to the present invention, further includes a sonar system for detecting a target. A pulse generator produces an electrical signal having a plurality of frequencies. An acoustic radiator formed as a first blazed acoustic array is arranged to be driven by the electrical signal from the pulse generator to radiate a acoustic field that includes a plurality of sonic frequencies with each frequency being radiated at a characteristic angle toward the target to be reflected therefrom. An acoustic receiver formed as a second blazed acoustic array is arranged such that components of the acoustic field reflected from the target toward the acoustic receiver produce acoustic waves therein having frequencies that correspond to the angles of incidence of the reflected acoustic field components. The signals indicative of the reflected frequencies received are processed to form an image of the target.

Other objects, benefits, and advantages will be readily apparent as the subject invention becomes better understood by reference to the following detailed description, when considered in conjunction with the accompanying drawings.

DESCRIPTION OF THE PREFERRED EMBODIMENT

Figure 1:
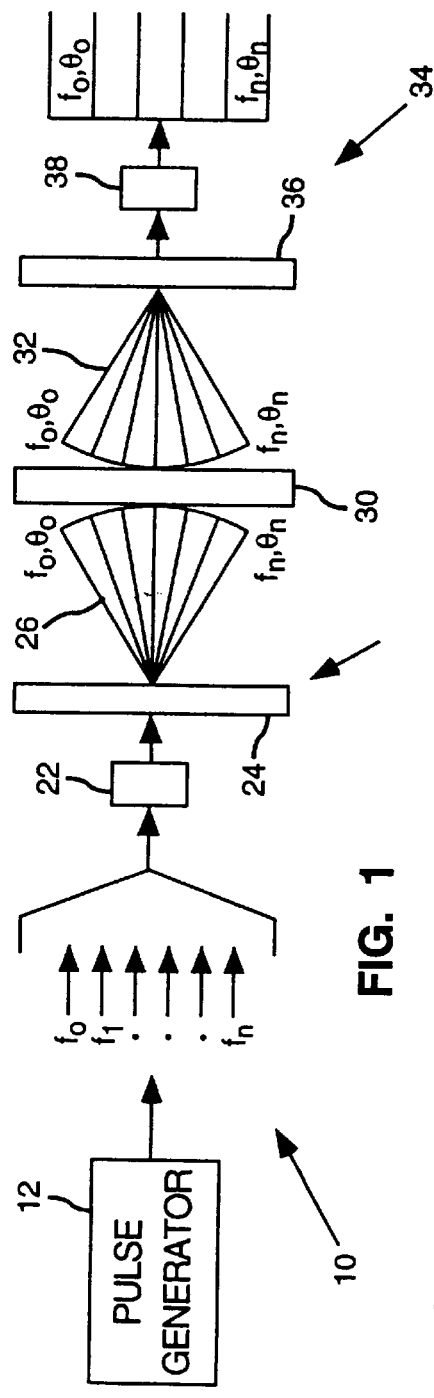
FIG. 1 is a schematic diagram of the flow of a pulse using an active system with blazed arrays on both transmit and receive arrays.

FIG. 1 illustrates a sonar system 10 according to the present invention. A pulse generator 12 forms a broadband electrical signal that includes frequencies $f_o \ldots f_n$. The electrical signal output from the pulse generator 12 is input to a projector 20, which includes projector electronics 22 and a projector array 24. The projector array 24 in the illustrated embodiment is preferably formed as a blazed array, which creates a frequency-dispersed sound field 26. The blazed array is explained in greater detail subsequently with reference to FIGS. 2A–2D.

The frequency-dispersed sound field 26 output of the projector array 24 is angularly distributed about an axis as indicated by the lines labeled $f_o, \theta_o \ldots f_n, \theta_n$. This sound field 26 has a known mapping between angular space and frequency. The sound field 26 interacts with a target 30 and the ambient environment to form a backscattered sound field 32 that is incident upon a receiver 34 that includes a receiver array 36 and receiver electronics 38. The receiver array 36 preferably also is formed as a blazed array.

The backscattered sound field 32 is combined by the receiver 34 into a single broadband signal. Each frequency in the scattered broadband signal has an associated angle such that each backscattered frequency corresponds to a portion of the target that is displaced a known angle from the axis. A B-scan type image can now be recovered from this single broadband signal through time-frequency (i.e. spectrogram, Wigner distributions) or time-scale (wavelet decomposition) processing. Because there is a non-linear mapping between frequency and angular space and because the effective aperture changes with angle, the azimuthal resolution of the sonar system 10 varies over the field of view. Detecting the frequencies in the backscattered signal provides signals that can be processed to form an image of the target 30.

FIGS. 2A–2D illustrate features of a simple structure for a blazed array 50. The blazed array 50 is the acoustic analog of a blazed or echelette diffraction grating (not shown) in optics. The two primary differences between the blazed acoustic array 50 and the typical blazed optical diffraction grating are; (1) the waves in a blazed acoustic array are traveling in water and 2) the individual facets of the blazed acoustic array 50 actually radiate or receive energy instead of just reflecting energy as in the optical case. The top of each step in the array 50 is an active surface that may be driven electrically to oscillate at the sonic frequency or allowed to oscillate at the sonic frequency in response to an incident acoustic field.

Figure 2D:
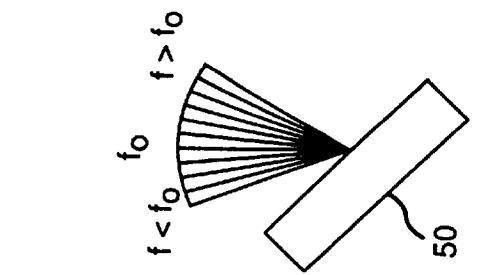
FIG. 2D illustrates relative beam widths in the field of view of a blazed array.
Figures 2A, 2B, 2C:
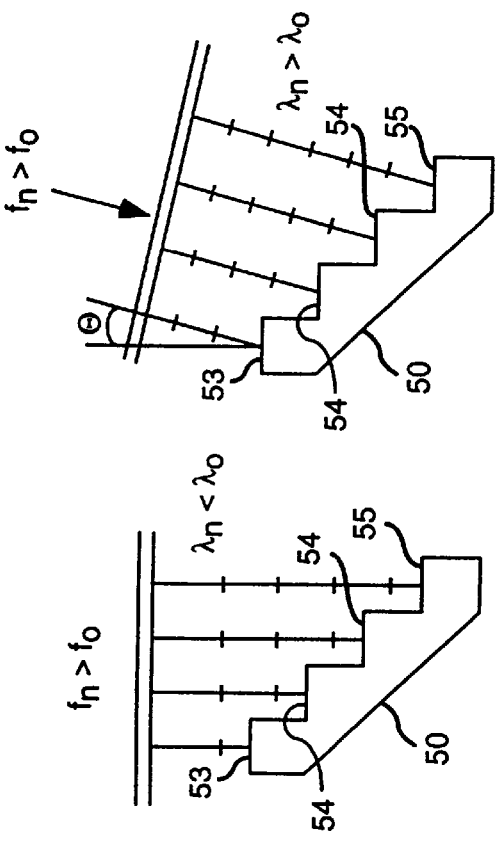
FIG. 2A illustrates a blazed array with waves incident perpendicular to the element faces and having frequency equal to a design frequency $f_o$ so that the waves arrive in phase.
FIG. 2B illustrates a blazed array with waves incident perpendicular to the element faces with frequency $f_n$, greater than $f_o$, so that the waves arrive out of phase.
FIG. 2C illustrates a blazed array with waves incident at an angle at which the waves of frequency $f_n$ arrive in phase.

FIGS. 2A–2D illustrate the physics behind the ability of the blazed array 50 to steer the main beam of the array as a function of frequency. FIG. 2A shows a plurality of stair-stepped elements 52–55 arranged so that each element is stepped back one wavelength $\lambda_o$ of the design frequency $f_o$ from the neighboring element. This results in all the waves arriving in phase at each of the elements 52–55 when a wave field at frequency $f_o$ is incident on the array 50 perpendicular to the element faces.

As shown in FIG. 2B, if the frequency of the wave field is increased above $f_o$, then the wavelength becomes shorter than $\lambda_o$ and will not arrive in phase when arriving at perpendicular incidence relative to the element faces. However, As shown in FIG. 2C, there is some angle $\Theta$ at which the higher frequency wave field will arrive in phase on all elements 52–55. The exact design of the array 50 determines the relationship between this angle $\Theta$ and frequency. The function of the blazed array 50 causes this relationship to be non-linear and therefore creates a non-linear mapping between frequency and angular space. This causes the azimuthal resolution of the sonar to vary over the field of view.

It is appropriate to note that in this case the function of the array 50 is described in a first order mode. In other words, a wave field of frequency $nf_o$ (where n=1, 2, 3 . . . ) would also arrive in phase when incident perpendicular to the faces of the elements 52–55. This means that blazed arrays can be designed to work in higher-order and multi-order modes.

The sonar system 10 of FIG. 1 may include a blazed array 50 as shown in FIGS. 2A–2D (or other suitable or equivalent blazed array structure or means) in either the projector 20, the receiver 34, or both. This fact, coupled with the fact that this technique can be used orthogonal to and in parallel with conventional beamforming, provides a measure of flexibility that makes this invention applicable to a number of different sonar configurations.

For example, a broadband toroidal volume search sonar (TVSS) projector (not shown) could be used to create a toroidal frequency-dispersed sound field (dispersed along-track). A conventional, TVSS receiver (not shown) could then generate multiple along-track sets of conventionally formed radial beams without any additional receiver channels. The multiple along-track beams would result in additional looks (increased probability of detection) and increased speed (increased area coverage rate).

Another application of the present invention is in the form of a side scan sonar. The present invention can be used to provide multiple vertical beams to real-aperture or synthetic-aperture sonar without adding hardware channels. Adding multiple vertical beams to side look sonar or synthetic aperture sonar systems significantly reduces multipath interference, improves the signal-to-noise ratio, and provides vertical discrimination for better classification of volume and bottom targets.

Other applications of the invention can take the form of high performance disposable sonars. Using the present invention, multi-beam sonars can be designed around a single hardware channel with low cost arrays and dedicated digital signal processing chips. Such a sonar could provided a two order of magnitude reduction in cost and absorb much less volume in the cramped quarters of small underwater vehicles without sacrificing performance. In a similar way, a multi-beam forward looking sonar can be created around a single hardware channel.

Figure 3:
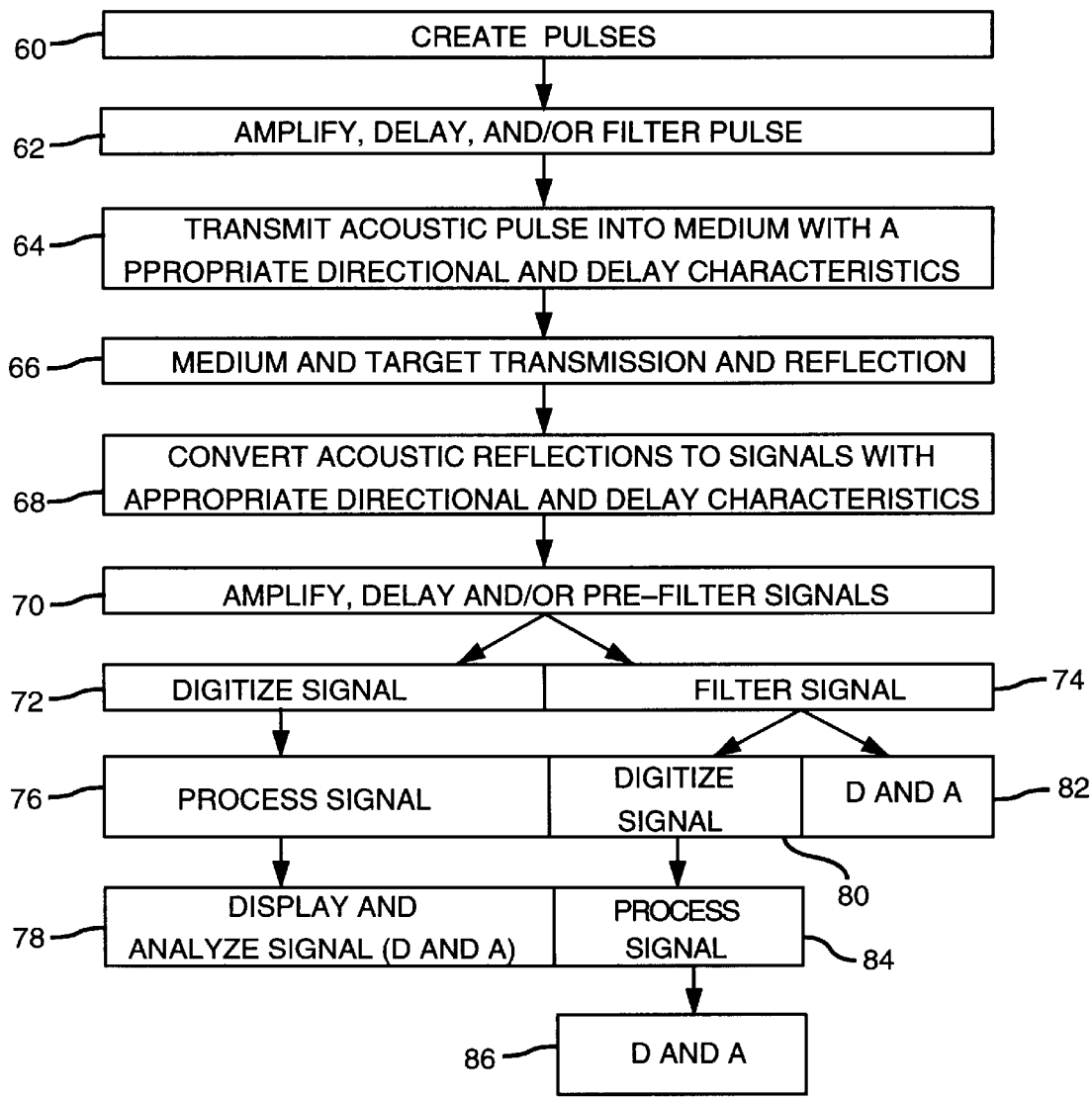
FIG. 3 is a functional block diagram of an active embodiment of the invention.

FIG. 3 shows a functional block diagram of an active system embodiment using the process of the present invention. The process begins with the creation of an analog or digital pulse as indicated in block 60. This pulse could be an FM pulse, a scale-swept wavelets pulse train, a multi-wavelet or multi-frequency pulse, or a host of other candidates. The process proceeds with any necessary amplification and filtering as indicated in block 62.

Block 64 indicates transmission of acoustic signal into the medium containing the target. Some embodiments of the process may include delays as shown in block 64. The delays may be implemented as 1-dimensional or 2-dimensional digital or analog delays. This step may be carried out using a 1-dimensional blazed or non-blazed array, a 2-dimensional array blazed in one, two, or no dimensions, or a conformal array. Blazing may be accomplished with spatial separation using the ambient medium to create temporal delays, rotation of the elements faces away from the general plane of the array, or application of a grating or other device that alters transmission of the acoustic signals into the ambient medium after the pulse has left the transmitter.

The pulse is then transmitted and reflected by the target and environment as indicated in block 66. The acoustic reflections are then converted into signal as shown in block 68. As in block 64, this step may be carried out using a 1-dimensional blazed or non-blazed array, a 2-dimensional array blazed in one, two, or no dimensions, or a conformal array. Blazing may be accomplished as described above with reference to block 64 by any suitable technique or means that alters the acoustic signals transmission from the ambient medium before the reflections have reached the receiver.

As indicated in block 70 the signal may be amplified and filtered as necessary. In some embodiments delays may also be applied to individual signals at this functional step.

A number of approaches may be used in the remainder of the signal processing. The signals from block 70 may be digitized as indicated in block 72 and processed and displayed and analyzed as indicated in blocks 76 and 78, respectively.

The signals from block 70 may alternatively be filtered as indicated in block 74 and then either digitized as shown in block 80 or displayed and analyzed as shown in block 84. The digitized signal from block 80 may be processed as shown in block 84 and then displayed and analyzed as shown in block 86.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A sonar system for detecting a target, comprising:
   a pulse generator for producing an electrical signal having a plurality of frequencies $f_o, f_1, \ldots f_n$;
   an acoustic radiator formed as a first blazed acoustic away having a first plurality of acoustic elements arranged in a first stepped array with adjacent acoustic elements being displaced from one another along an axis by a distance $\lambda_o$ that is one acoustic wavelength corresponding to the frequency $f_o$, the first plurality of acoustic elements being arranged to be driven by the electrical signal from the pulse generator to radiate an acoustic field that includes a plurality of sonic frequencies with each frequency being radiated at a characteristic angle toward the target to be reflected therefrom;
   an acoustic receiver formed as a second blazed acoustic array having a second plurality of acoustic elements arranged in a second stepped array with adjacent acoustic elements being displaced from one another along an axis by a distance $\lambda_o$ that is one acoustic wavelength corresponding to the frequency $f_o$ such that components of the acoustic field reflected from the target toward the acoustic receiver produce acoustic waves therein having frequencies that correspond to the angles of incidence of the reflected acoustic field components; and
   means for processing signals indicative of the reflected frequencies to form an image of the target.

2. The apparatus of claim 1, including apparatus for producing independent sets of beams along a second dimension of an acoustic system's field of view further comprising means for producing multiple independent beams along a first dimension of said acoustic system's field of view with beamforming means selected from the group consisting of phase delay, time delay, and synthetic aperture beamforming.

3. The process of frequency steered acoustic beamforming comprising the steps of:

Step 1: producing a pulsed electrical signal having a plurality of frequencies $f_o$, $f_1$, ... $f_n$ appropriately amplified, filtered, and delayed;

Step 2: converting said pulsed electrical signal into a frequency-dispersed radiated acoustic field having appropriate directional and delay characteristics and transmitting said acoustic field into an ambient medium containing a target by means of an acoustic radiator formed as a first blazed acoustic away having a first plurality of acoustic elements arranged in a first stepped array with adjacent acoustic elements being displaced from one another along an axis by a distance $\lambda_o$ that is one acoustic wavelength corresponding to the frequency $f_o$, the first plurality of acoustic elements being arranged to be driven by the electrical signal from the pulse generator to radiate an acoustic field that includes a plurality of sonic frequencies with each frequency being radiated at a characteristic angle toward the target to be reflected therefrom;

Step 3: receiving a reflected acoustic field from said target and ambient medium by means of an acoustic receiver formed as a second blazed acoustic array having a second plurality of acoustic elements arranged in a second stepped array with adjacent acoustic elements being displaced from one another along an axis by a distance $\lambda_o$ that is one acoustic wavelength corresponding to the frequency $f_o$ such that components of the acoustic field reflected from the target toward the acoustic receiver produce acoustic waves therein having frequencies that correspond to the angles of incidence of the reflected acoustic field components and converting said reflections to electrical signals having appropriate directional and delay characteristics; and Step 4: processing said electrical signals to yield target image data.

4. The process of claim 3 wherein said step of converting and transmitting said electrical signal to a frequency-dispersed radiated acoustic field is carried out using a one dimensional means for introducing the desired delays.

5. The process of claim 4 wherein said one-dimensional means for introducing desired delays are selected from the group of acoustic arrays consisting of a non-blazed array, a blazed array having a plurality of elements formed in an echelon array with adjacent acoustic elements displaced from one another and a conformal array.

6. The process of claim 3 wherein said step of converting and transmitting said electrical signal to a frequency-dispersed radiated acoustic field is carried out using a two-dimensional acoustic array blazed in one, two, or no dimensions.

7. The process of claim 5 wherein said blazed array provides spatial separation and the ambient medium provides temporal delays.

8. The process of claim 5 wherein said blazed array employs rotation of array elements away from the general plane of the array.

9. The process of claim 3 wherein said radiated acoustic field includes a plurality of sonic frequencies with each of said frequencies being radiated at a characteristic angle.

10. The process of claim 3 wherein said reflected acoustic field contains frequencies corresponding to the angles of incidence of the reflected acoustic field components.

* * * * *